Aug. 16, 1960
G. F. E. LOECK
2,949,056
OPTICAL PLUMMET
Filed July 11, 1955
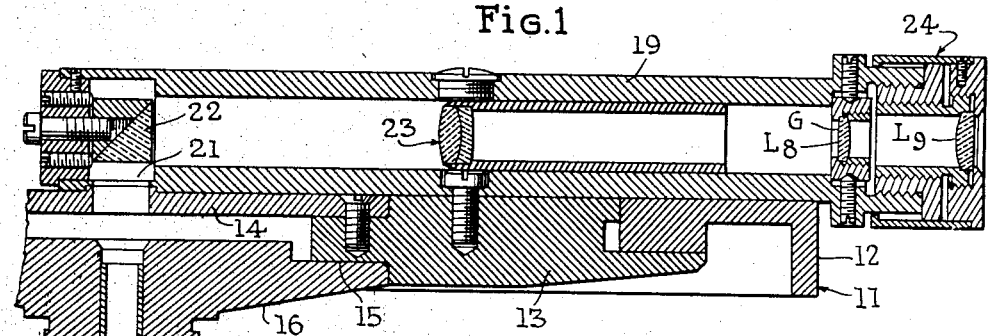
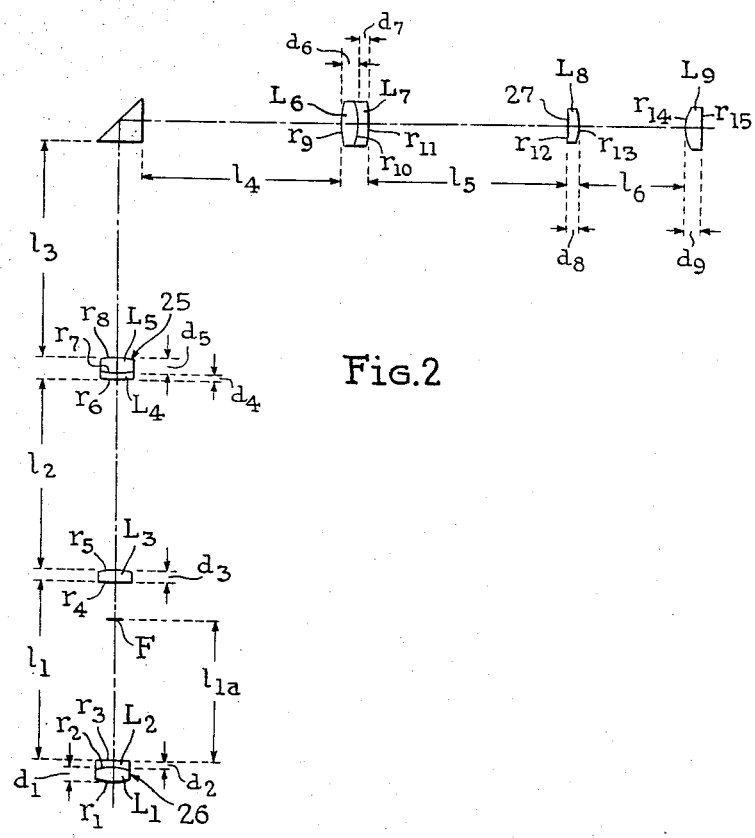
INVENTOR
Günther F. E. Loeck
BY *Dodge and Sons*
ATTORNEYS

United States Patent Office 2,949,056
Patented Aug. 16, 1960

2,949,056

OPTICAL PLUMMET

Günther F. E. Loeck, Troy, N.Y., assignor to W. & L. E. Gurley, Troy, N.Y., a corporation of New York Filed July 11, 1955, Ser. No. 521,239

3 Claims. (Cl. 88—2.3)

This invention relates to optical plummets for use with surveying instruments and the like.

Specifically it concerns an optical lens system which may be placed in a small bore extending axially through the spindle. The ability to place the optical system so that it is housed in the spindle is important since in this way the alinement between the spindle axis and the optical axis is maintained unless the spindle itself is damaged. It is a desirable feature of the invention that the bore through the spindle be small whereby the size of the spindle need not be increased to assure its rigidity, as would be the case if the diameter of the bore were large.

The small diameter of the telescope tube, i.e. the bore through the spindle, requires the use of a special lens system if an adequate field of view is to be obtained and if the image produced is lightstrong or bright.

In the embodiment to be described, the lens diameter is on the order of 0.217 inch (5.51 mms.) or approximately one fifth of an inch. The objective lens system comprises four lenses, three of which are housed in the spindle and the fourth in a horizontal tube. A 45° prism is provided between this fourth lens and the other three. A two lens eyepiece is provided to produce, at the viewing eye, a magnified image of the image produced by the objective lens system.

The lens system is designed to include a front lens which has a short focal length whereby a small image of a relatively large field of view may be obtained. This small image is projected through a lens system onto the focal plane of a viewing eyepiece. This viewing eyepiece is designed so that its front focal plane lies on the plane surface of the front lens thereof. A reticle is formed directly on this plane surface, and the projected image lies on this plane and may be accurately centered by adjusting the transit level and position.

The lens system which projects the small image produced by the front lens onto the focal plane of the eyepiece includes a first lens which serves to converge the light rays, especially those which produce the outer portion of the small image, so that they are passed to the second lens of the projection lens system well within the limits of the small aperture of that second lens.

A preferred embodiment of the invention will be described having reference to the accompanying drawing in which:

Figure 1 is a fragmentary sectional view taken on a plane of section through the axis of the spindle and including the optical axis of the optical plummet.

Figure 2 is a diagrammatic showing of the lens system of the plummet.

As shown the base plate of a conventional transit appears at 11. It comprises an outer portion 12; an intermediate portion 13 which carries the trunnion arms not shown, and a central portion 14 having a central aperture as shown. These portions are fastened together by means not shown, to form a unitary base plate. The lower, inner, radial face 15 of portion 13 is connected with the flange 16 formed integrally with the spindle 17 which is journalled in a conventional levelling head not shown.

As shown in Figure 1, an axial opening 18 extends through the spindle 17. Mounted in the opening 18 is a lens system comprising three lens elements. Fastened to the upper face of the base plate 11 of the transit is a horizontally extending telescope tube 19. An opening 21 formed in the side wall of tube 19 is arranged with its center lying on the axis of the spindle. Carried at the end of the tube 19 adjacent the opening 21 is a 45° reflecting prism 22. The prism is mounted so as to be axially adjustable in tube 19 so that the axes of tube 19 and opening 18 may be optically alined. Mounted in the tube 19 is a cemented doublet 23. A two lens viewing eyepiece 24 is mounted on the outer end of the tube 19.

Referring now to Figure 2, the front lens 26 is a cemented doublet comprising lenses $L_1$ and $L_2$ and has a short focal length. This doublet comprises a bi-convex element $L_1$ and a plano-concave element $L_2$ as shown in Figure 2. This doublet produces a small image of a wide field of view at F. This image is projected onto the focal plane of the eyepiece by a lens system including the plano-convex lens $L_3$, a cemented doublet 25 comprising lenses $L_4$, $L_5$ and a cemented doublet 23 which comprises lenses $L_6$, $L_7$. The prism 22 reflects the collimated light rays between lenses 25 and 23 as shown. An eyepiece comprising plano-convex lenses $L_8$ and $L_9$ is provided. This eyepiece is so designed that its anterior focal plane is on the front plane surface of lens $L_8$. This focal plane coincides with the rear focal plane of the projection lens system. A reticle 27 is desirably formed in the plane face of lens $L_8$ whereby coincidence between the desired center of the field of view of the plummet and center of the reticle may be determined.

The second image G, i.e. the one produced on the reticle is desirably slightly larger than the image produced at F. This is made possible by the fact that the diameter of the tube 19 can be larger than the diameter of the bore 18 in the spindle.

The following table includes the optical data relating to the lenses as illustrated in Figure 2. The measurements are all given in millimeters and are identified by reference letters in Figure 2.

| Lens | Radii | Diam. | Thicknesses and Air Spaces | Types of Glass | |
|---|---|---|---|---|---|
| | | | | $n_D$ | V |
| $L_1$ | $r_1 = +9.25$ | 5.51 | $d_1 = 2.30$ | 1.5125 | 60.5 |
| | $r_2 = -9.25$ | | | | |
| $L_2$ | $r_2 = -9.25$ | 5.51 | $d_2 = 1.00$ | 1.617 | 36.6 |
| | $r_3$ Plano | | $l_1 = 33.35$ ($l_{1a} = 26.70$) | | |
| | $r_4$ Plano | | | | |
| $L_3$ | $r_5 = -22.38$ | 5.51 | $d_3 = 1.50$ | 1.5125 | 60.5 |
| | $r_6 = +71.45$ | | $l_2 = 28.68$ | | |
| $L_4$ | $r_7 = +18.16$ | 5.51 | $d_4 = 1.30$ | 1.649 | 33.8 |
| | $r_7 = +18.16$ | | | | |
| $L_5$ | $r_8 = -22.12$ | 5.51 | $d_5 = 2.50$ | 1.517 | 64.5 |
| | | | $l_3 = 58.00$ | | |
| Prism | | Right Triangular, Each Side 7.62 mm | | 1.517 | 64.5 |
| | | | $l_4 = 42.00$ | | |
| $L_6$ | $r_9 = +27.66$ | 7.92 | $d_6 = 3.00$ | 1.517 | 64.5 |
| | $r_{10} = -22.67$ | | | | |
| $L_7$ | $r_{10} = -22.67$ | 7.92 | $d_7 = 1.50$ | 1.649 | 33.8 |
| | $r_{11} = -89.25$ | | $l_5 = 47.56$ | | |
| | $r_{12}$ Plano | | | | |
| $L_8$ | $r_{13} = -22.38$ | 5.51 | $d_8 = 1.50$ | 1.5125 | 60.5 |
| | $r_{14} = +10.10$ | | $l_6 = 18.98$ | | |
| $L_9$ | $r_{15}$ Plano | 7.92 | $d_9 = 2.00$ | 1.517 | 64.5 |

The lens $L_3$ is a convergent lens and designed so that the light rays producing image F and particularly those which produce the outer portions of that image are transmitted to the doublet 25 within the relatively small aperture of that doublet.

Because the image G and the reticule are coplanar the viewer sees a magnified sharp image of both. The viewer can best be sure of a proper instrument setting by checking the alinement of the reticule center and the center of the field of view from two or more different points. Therefore, the tube 19 is mounted so as to be angularly displaced in a horizontal plane about the spindle axis as the axis of rotation. In this way, any slight deviation from precise alinement will be more readily observed.

What is claimed is:

1. An optical plummet for a surveying instrument of the type having a spindle, the spindle having a small axial bore therethrough, said plummet including a telescope tube, whose longitudinal axis intersects the axis of said bore, said tube being rotatable about said bore as an axis; an objective lens system comprising a front lens element in said bore and having a short focal length whereby a primary image smaller than the bore is produced therein of a field of view many times greater in size; a projecting lens system including second and third lens elements in said bore and a fourth lens element in said tube, said second lens element being a convergent lens element designed to transmit light rays from all parts of said primary image to said third lens element within the optical aperture thereof; an optical reflecting element at the intersection of said longitudinal axes whereby the axis of said tube is optically aligned with the axis of said spindle; a reticule in said tube at the plane of the projected image formed by said projecting lens system; and a viewing eyepiece in the end of said tube remote from said intersection for simultaneously viewing the projected image and the reticule.

2. The combination defined in claim 1 in which said viewing eyepiece includes a front plano-convex lens, the front surface of said plano-convex lens being plane, said eyepiece being optically designed so that its anterior focal plane lies on said front surface and in which the reticule is formed on that surface.

3. The combination defined in claim 1 in which said projecting lens system produces collimated light between said third and fourth lenses.

References Cited in the file of this patent

UNITED STATES PATENTS

| | | |
|---|---|---|
| 804,624 | Saegmuller | Nov. 14, 1905 |
| 962,175 | Straubel | Jan. 21, 1910 |
| 1,827,135 | Blake | Oct. 13, 1931 |
| 1,848,788 | Loeck | Mar. 8, 1932 |
| 2,485,558 | Braunlich | Oct. 25, 1949 |